(12) United States Patent
Sylvain et al.

(10) Patent No.: US 6,930,998 B1
(45) Date of Patent: Aug. 16, 2005

(54) HYBRID TDM AND ATM VOICE SWITCHING CENTRAL OFFICE AND METHOD OF COMPLETING INTER-OFFICE CALLS USING SAME

(75) Inventors: Dany Sylvain, Gatineau (CA); Faizel Lakhani, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/206,277

(22) Filed: Dec. 7, 1998

(51) Int. Cl.[7] .............................................. H04L 12/66

(52) U.S. Cl. .................. 370/352; 370/353; 370/395.61

(58) Field of Search ................................ 370/352–356, 370/395.1, 395.52, 395.61, 400–401, 465–466

(56) References Cited

U.S. PATENT DOCUMENTS

| | | | | |
|---|---|---|---|---|
| 5,204,857 A | * | 4/1993 | Obara | 370/354 |
| 5,838,682 A | * | 11/1998 | Dekelbaum et al. | 370/401 |
| 6,282,281 B1 | * | 8/2001 | Low | 379/230 |
| 6,285,680 B1 | * | 9/2001 | Steinka et al. | 370/352 |
| 6,349,096 B1 | * | 2/2002 | Liu et al. | 370/238 |
| 2001/0028644 A1 | * | 10/2001 | Barzegar et al. | 370/352 |
| 2002/0010818 A1 | * | 1/2002 | Wei et al. | 710/62 |

FOREIGN PATENT DOCUMENTS

| | | | | |
|---|---|---|---|---|
| EP | 0719068 A2 | 6/1996 | .......... | H04Q 11/04 |
| EP | 0792076 A2 | 8/1997 | .......... | H04Q 3/00 |
| WO | WO 95/17789 | 6/1995 | .......... | H04L 12/64 |
| WO | WO 98/28901 | 7/1998 | .......... | H04M 3/50 |

* cited by examiner

Primary Examiner—John Pezzlo
Assistant Examiner—Saba Tsegaye
(74) Attorney, Agent, or Firm—Withrow & Terranova, PLLC (57) ABSTRACT

A hybrid central office for serving a plurality of subscriber lines while serving as a virtual access tandem to a subnetwork of central offices having a connection to an ATM backbone network is described. The hybrid central office includes a computing module having a messaging interface to the ATM network, an inter-working trunk interface to the ATM network and a trunk connection to the PSTN. The hybrid central office serves as a tandem switch for other central offices connected to the subnetwork. Other central offices are preferably connected to the subnetwork by a signal large trunk group. All inter-office call routing is therefore handled by the hybrid central office. The hybrid central office also provides a gateway to the PSTN. Inter-office calls originated and terminated within the subnetwork are set up by the virtual access tandem but after call set up, the virtual access tandem is not involved in the call. The advantage is the utilization of spare processing capacity in a central office to off-load inter-office trunking congestion, as well as a significant reduction in trunking maintenance costs.

50 Claims, 7 Drawing Sheets

HYBRID TDM AND ATM VOICE SWITCHING CENTRAL OFFICE AND METHOD OF COMPLETING INTER-OFFICE CALLS USING SAME

TECHNICAL FIELD

The present invention, relates to the transfer of voice and voice grade telephone data over asynchronous transfer mode (ATM) facilities and, in particular, to a novel subnetwork arrangement in which a central office serves a plurality of subscriber lines while serving as a virtual access tandem to a subnetwork of central offices having a connection to an ATM backbone network.

BACKGROUND OF THE INVENTION

The introduction of the Internet to the general public and the ensuing explosion of interest and demand for access to the Internet through telephone service provider networks has placed considerable strain on existing telecommunications infrastructure. Telephone service provider networks are now being overwhelmed by the explosion of data traffic over an infrastructure that was not intended for and is not capable of supporting the exponential increase in demand currently being experienced. This exponential increase in demand is particularly responsible for the exhaustion of resources at the access tandem level of the public switched telephone network (PSTN).

Concurrently with the explosion and demand for telephone services, most regulatory authorities have now opened the telephone service market to competition. Consequently, the incumbent service providers no longer enjoy a monopoly which makes massive capital investment in infrastructure attractive. There has therefore been a notable interest in new methods for increasing call handling capacity and reducing overhead and operating costs. Voice and voice grade data services over ATM networks have been proposed by several equipment providers as an alternative architecture for new infrastructure to augment the PSTN. The inherent advantages and disadvantages of ATM networks are well known. ATM offers flexible routing solutions which enable more efficient use of resources than the traditional hierarchical structure which has evolved in the PSTN. However, current ATM switches are incapable of call set up rates expected by the general public. Nonetheless, the diligent application of ingenuity has substantially overcome the disadvantages of the use of ATM to support voice and voice grade data services and ATM subnetworks are being constructed to off-load portions of the bearer traffic contributing to congestion in the PSTN.

A principal focus of the technical developments respecting the use of ATM networks to relieve congestion in the PSTN has been the use of ATM networks as a transport backbone for voice and voice grade data. While this focus has lead to the invention of many valuable tools useful in providing reliable service at competitive rates, the problem of inter-office trunking growth has only been partially addressed. There therefore exists a need for a method and apparatus capable of handling trunking growth economically, while reducing overhead maintenance costs in order to enable the provision of telephone services at competitive prices.

SUMMARY OF THE INVENTION

It is therefore a primary object of the invention to provide a hybrid central office for serving a plurality of subscriber lines while also serving as a virtual access tandem to a subnet of central offices connected to an ATM backbone network.

It is a further object of the invention to provide a subnetwork of central offices in which each of the central offices are connected by a trunk group to an ATM-based virtual access tandem, which is responsible for routing all calls originating in or terminating in the subnetwork.

It is yet a further object of the invention to provide a subnetwork in which the virtual access tandem is responsible for routing calls originating and terminating in the subnetwork.

It is yet a further object of the invention to provide a telephone subnetwork which utilizes an ATM backbone for completing switched telephone calls in which a plurality of central offices are connected to the ATM backbone by interfaces for converting pulse code modulated (PCM) data to ATM cells and vice versa, and one of the plurality of central offices is adapted to function as a virtual tandem for the subnetwork.

It is yet a further object of the invention to provide a method of completing an inter-office call originating at a central office in a subnetwork that includes a plurality of central offices which respectively serve a plurality of subscriber lines, a one of the central offices serving as a virtual tandem for the subnetwork.

The invention therefore provides a hybrid central office for serving a plurality of subscriber lines while serving as a virtual access tandem to a subnetwork of central offices having a connection to an ATM backbone network, comprising an inter-working bearer traffic interface to the ATM backbone network to permit the hybrid central office to receive bearer traffic from and transfer bearer traffic to any one of the central offices in the subnetwork, the inter-working bearer traffic interface being adapted to convert pulse code modulated (PCM) data to ATM cells and vice versa; a trunk interface to the public switched telephone network (PSTN) to permit the hybrid central office to receive PCM data from and transfer PCM data to the PSTN; and a computing module having a signaling interface to the ATM backbone network to permit the computing module to send messages to and receive messages from any one of a plurality of distributed-access bearer traffic interfaces respectively associated with the central offices in the subnetwork, the computing module being adapted to access information for routing inter-office calls originated at or terminated at any one of the central offices.

In accordance with a further aspect of the invention there is provided a telephone subnetwork which utilizes an ATM backbone for completing switched telephone calls, comprising in combination a plurality of central offices connected to the ATM backbone by respective interfaces for converting PCM data to ATM cells and vice versa, each of the central offices being respectively adapted to serve a plurality of subscriber lines; and a one of the plurality of central offices being further adapted to function as a virtual tandem for the subnetwork and to control inter-office call routing for calls that originate or terminate in the subnetwork.

In yet a further aspect of the invention, there is provided a method of completing an inter-office call originating at a central office in a subnetwork that includes a plurality of central offices which respectively serve a plurality of subscriber lines, each of the central offices being connected to an ATM backbone network by an interface that converts PCM data to ATM cells and vice versa, a one of the central offices serving as a virtual tandem for the subnetwork, comprising the steps of:

a) at the originating central office, formulating an IAM relating to the inter-office call, the IAM containing a destination point code (DPC) of the virtual tandem;

b) receiving the IAM at the virtual tandem and translating a called number in the IAM to determine a next hop destination for the call;

c) modifying the IAM to change an originating point code (OPC) to the point code of the virtual tandem and the destination point code (DPC) to the point code of the next hop destination for the call, and forwarding the modified IAM to the next hop destination for the call;

d) formulating a fabric control message and sending the fabric control message through the ATM backbone to a terminating interface in the subnetwork to enable a virtual circuit through the ATM backbone to transfer the call; and e) sending a connection message from the terminating interface in the subnetwork to an interface associated with the originating central office to enable the virtual circuit for transferring the call through the ATM backbone.

The invention therefore provides a novel structure for a subnet of central offices connected to an ATM backbone which is adapted to relieve inter-office trunking congestion while providing an efficient network structure that enables competitive pricing of telephone services. In accordance with the novel subnetwork structure, a plurality of central offices are connected by interfaces to an ATM backbone network. One of the central offices, preferably one having the most idle computing capacity, is designated as a virtual tandem for the subnetwork. That central office can maintain time division multiplexed (TDM) trunk groups connected to other central offices. Each of the central offices in the subnetwork are connected to the ATM backbone via interfaces which convert pulse code modulated (PCM) data to ATM cells and vice versa. Each of the central offices in the subnetwork are preferably connected to the respective interfaces by a single large trunk group. Consequently, all inter-office calls originated at any one of the central offices aside from the virtual access tandem are routed to the large trunk group. A link set associated with the large trunk group points to the virtual access tandem. As a result, the virtual access tandem is responsible for the routing of all inter-office calls originated within or terminated within the subnetwork. Routing and translation tables for the subnetwork are therefore centralized in the virtual access tandem. Consequently, translation and routing table maintenance is centralized and more efficient. Furthermore, maintenance costs for the physical trunking at each central office are significantly reduced because the only trunking required is a large high capacity trunk, which may be a high speed optical link between each central office and the respective interface(s).

The invention therefore provides a cost effective, efficient apparatus and method for relieving congestion in the PSTN which utilizes existent infrastructure in a very efficient and effective way.

BRIEF DESCRIPTION OF THE DRAWINGS

The invention will now be explained by way of example only and with reference to the following drawings, wherein.

DETAILED DESCRIPTION OF THE PREFERRED EMBODIMENT

This invention relates to a subnetwork of telephone central offices connected through interfaces to an ATM backbone network. A one of the central offices is adapted to serve as a virtual access tandem in the subnetwork so that inter-office trunk congestion is relieved in the subnetwork.

System Overview

Figure 1:
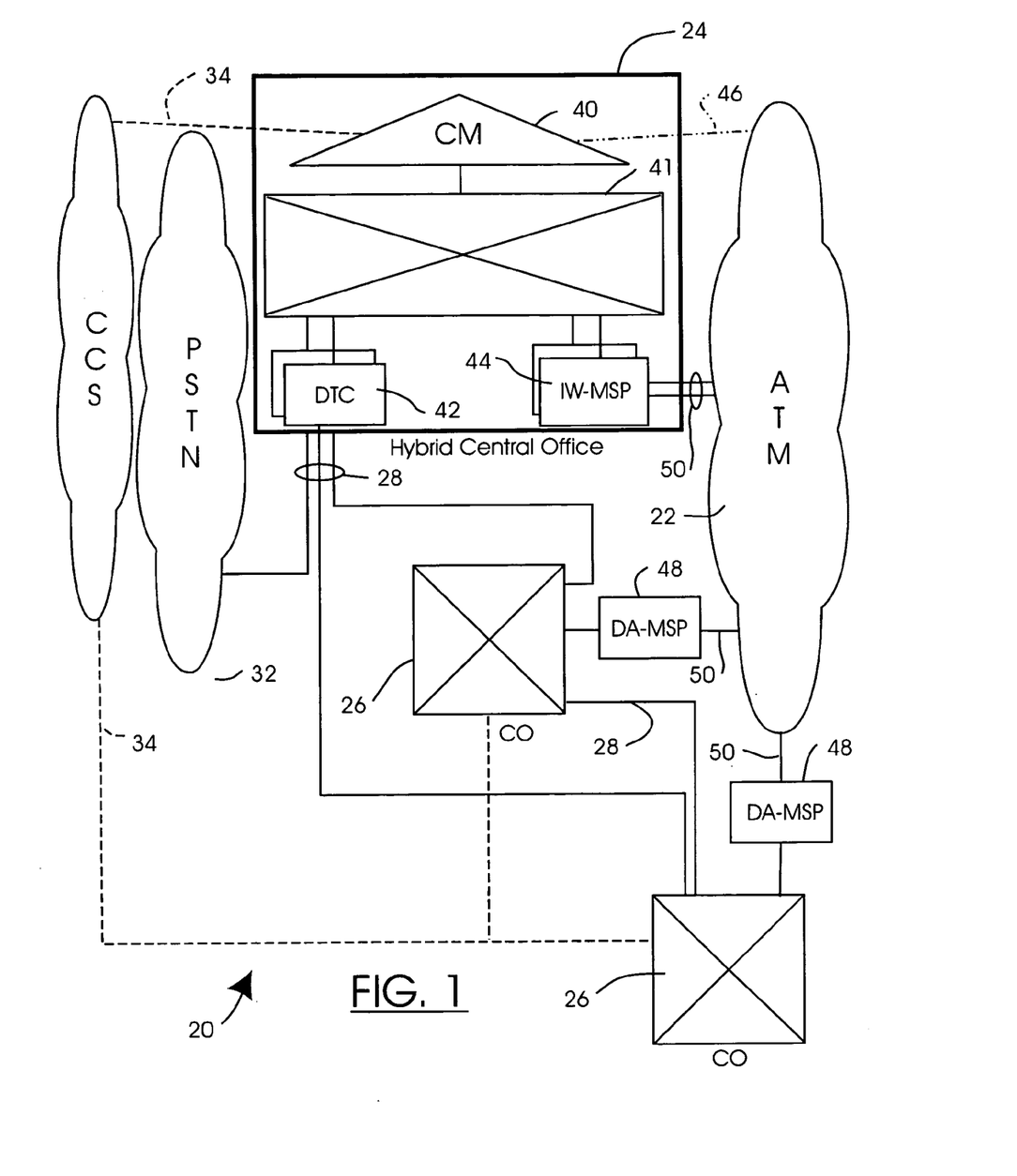
FIG. 1 is a schematic diagram illustrating the principal components of a hybrid central office in accordance with the invention shown in relation to portion of a subnetwork in accordance with the invention, as well as the PSTN and a common channel signaling network associated with the PSTN.

FIG. 1 shows a portion of a subnetwork of central offices generally indicated by the reference 20 having a connection to an ATM backbone network 22. The subnetwork includes a plurality of central offices, only three of which are shown in FIG. 1 due to space constraints. A one of the central offices is a hybrid central office 24 which serves a plurality of subscriber lines (not shown) while serving as a virtual access tandem to the subnetwork 20 of central office 26, each of which have a connection to the ATM backbone network 22. As will be appreciated by those skilled in the art, the hybrid central office 24 is also connected by existing time-division multiplexed (TDM) trunk groups 28 to the public switched telephone network (PSTN) 32 and to the other central offices 26. The other central offices 26 are likewise interconnected by existing TDM trunk groups 28. As is also understood by those skilled in the art, associated with PSTN 32 is a common channel signaling network 34 which typically operates under a Signaling System 7 (SS7) protocol which permits central offices to communicate with other nodes in the PSTN.

In order to ensure that incumbent infrastructure is utilized as efficiently as possible, the hybrid central office 24 is modified only to an extent required to enable it to perform the functions required of the hybrid central office 24 which serves as a virtual access tandem in the subnetwork 20. Each central office includes computing module (CM) 40 and a TDM switch fabric 41 which provides a link between subscriber lines and trunks for switching bearer traffic. Attached to the switch fabric 42 are digital trunk controllers (DTC) 42 which provide an interface to the PSTN 32 and inter-working multi-service platforms (IW-MSP) 44 which provide an interface to the ATM network 22. The interfaces to the ATM network perform several functions which will be described below in more detail. One of their primary functions is to convert pulse code modulated (PCM) voice and voice grade data to ATM cells, and vice versa.

The computing module 40 has a signaling interface 46 with the ATM backbone network 22 to permit the computing module 40 to send messages to and received messages from distributed access MSPs (DA-MSP) 48 which serve as interfaces to the ATM network 22 for the respective central offices 26. As described in Applicant's co-pending patent application entitled APPARATUS AND METHOD FOR COMPLETING INTER-SWITCH CALLS USING LARGE TRUNK GROUPS which was filed by the Applicant on Dec. 2, 1998 and is now U.S. Pat. No. 6,141,342, each of the central offices 26 is preferably connected to the ATM backbone network 22 by a single large trunk group 50. Configuring each of the end offices 26 with a single large trunk group has several distinct advantages as thoroughly explained in Applicant's co-pending patent application, the entirety of which is incorporated herein by reference.

Figure 2:
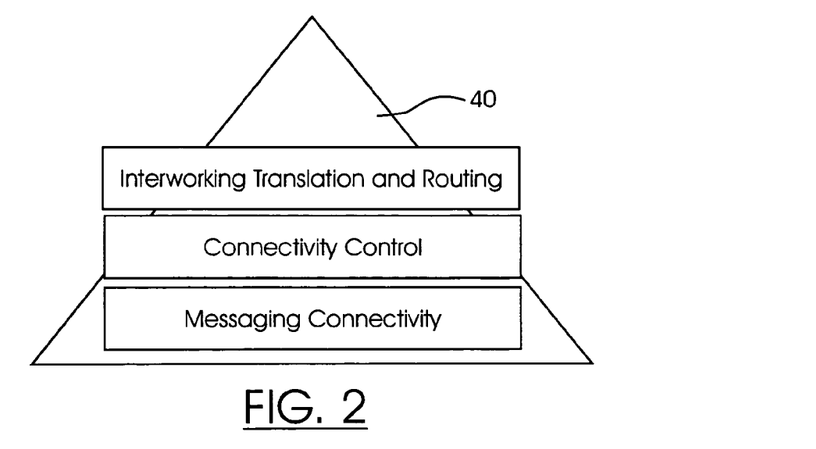
FIG. 2 is a schematic diagram showing the computing module of the hybrid central office shown in FIG. 1 and detailing the principal functional components of the computing module adapted to function in accordance with the invention.

FIG. 2 is a schematic diagram of the computing module 40, shown in FIG. 1, and the principal functional components of the invention developed and added to enable the hybrid central office to function as a virtual access tandem to the subnetwork 20 shown in FIG. 1.

The principal functional components added to the computing module 40 include inter-working translation and routing, connectivity control and messaging connectivity, each of which is briefly characterized as:

Inter-working Translation and Routing—Since each of the central offices is preferably connected to the subnetwork by a single large trunk group, the translation and routing tables in those central offices are extremely simple. All inter-office calls are routed to the single large trunk group. Consequently, it is the responsibility of the hybrid central office 24 to perform routing and translation functions for all calls that originate or terminate in the subnetwork 20. The translation and routing will be explained below in more detail. A further inter-working function is the responsibility for minimizing the incidence of inter-working call types, i.e., calls which originate in the ATM backbone and terminate in the PSTN. In order to accomplish this, the inter-working function must determine the character of the originating fabric base prior to evoking an algorithm shown below in FIG. 3.

Connectivity Control—The connectivity control function of the Computing Module 40 performs several critical functions. Connectivity control is required for all calls which involve an ATM component. Connectivity control is consequently required for all calls which originate or terminate in the subnetwork 20. A further function of connectivity control is the selection of an inter-working bridge for calls which originate in the ATM network and terminate in the PSTN, or vice versa. The inter-working bridge is a resource which is maintained and allocated in the computing module 40. An inter-working bridge is required for each inter-working call. A further function of connectivity control is the formulation and sending of fabric-control messages (FCM) which are used to establish or allocate switched virtual circuits through the ATM backbone for transferring bearer traffic. The FCMs contain information which is required by the interfaces for the respective central offices to enable ATM-related fabric connections. The content of such messages will be explained below in more detail with reference to FIGS. 4–7.

Messaging Connectivity—Messaging connectivity is a fundamental part of any network. The messaging connectivity layer hides the ATM nature of the communication path from the call processing applications of the computing module 40. Consequently, proxies operating in the messaging connectivity layer accept messages from the call processing applications of the computing module 40 and convert those messages into ATM cells which are emitted into the ATM backbone network 22. The proxies likewise receive messages from the ATM backbone network 22 and convert them into an internal format used by the call processing applications of the computing module 40.

ATM Network Interfaces

As shown in FIG. 1, interfaces are required between the central offices 24, 26 in the subnetwork 20 and the ATM backbone network 22. A principal function of the interfaces 44, 48 is to convert PCM data to ATM cells and vice versa. For purposes of clarity, the interfaces are identified as IW-MSP 44 and DA-MSPs 48. The reason for the distinction is that there is some difference in functionality as will be explained below. It should be understood, however, that the interfaces 44, 48 may be implemented on the same platform and require substantially identical hardware functionality.

The IW-MSP 44 provides an interface between the hybrid central office 24 and the ATM backbone 22. Its principal functions are to provide a bridge between the TDM fabric 41 and the ATM fabric 22. It is also responsible for initiating application instances which own inter-working bridges established through the TDM fabric 41 for inter-working calls and the TDM to ATM mapping associated with such calls. The IW-MSP also includes a functional entity hereinafter referred to as a "connection broker" which serves the functions of TDM component connection control; inter-working bridge connection control; ATM component connection control; the ATM-to-TDM interface and ATM-to-TDM path conversion.

The IW-MSP 44 connection broker may provide SVC caching services for TDM fabric to ATM bridged calls. ATM SVCs are switched virtual connections through the ATM network, which are preferred over permanent virtual connections because they permit more efficient use of network resources. In this context, the majority of the connection broker functionality actually resides in the DA-MSP 48 which is preferably delegated as master of the SVC cache between itself and the IW-MSP 44, as will be explained below in more detail. It should be understood, however, that cached SVCs are not required and an SVC may be set up for each call routed through the ATM fabric 22. The IW-MSP 44 also supports an ATM signaling interface and the connection broker must be adapted to interact with an ATM signaling stack for the purposes of cached SVC control. However, the IW-MSP 44 preferably only terminates cached SVCs which are controlled by the DA-MSPs 48. In order to support TDM fabric to ATM bridged calls, the IW-MSP 44 supports a connection to the TDM switch fabric 41 and a connection to the ATM backbone network 22. A messaging interface between the IW-MSP 44 and the DA-MSPs 48 is also required. Call processing requires that messages be exchanged between the interfaces in order to start integrity checking, report integrity failures, etc.

The DA-MSPs 48 likewise support a trunk interface connection to the central offices 26 and an ATM link to the ATM backbone network 22. The DA-MSPs 48 also include a functional component referred to as the connection broker. The connection broker preferably, but not necessarily, has responsibility for SVC caching to facilitate call set up response. In order to enable SVC caching, the connection broker must support an ATM messaging stack and an application programming interface (API) which permits the DA-SPM connection broker to maintain SVC caches. The DA-MSPs 48 also supports all the functionality described above with reference to the IW-MSPs, except for the inter-working bridge functionality.

Call-Type Determination

Figure 3:
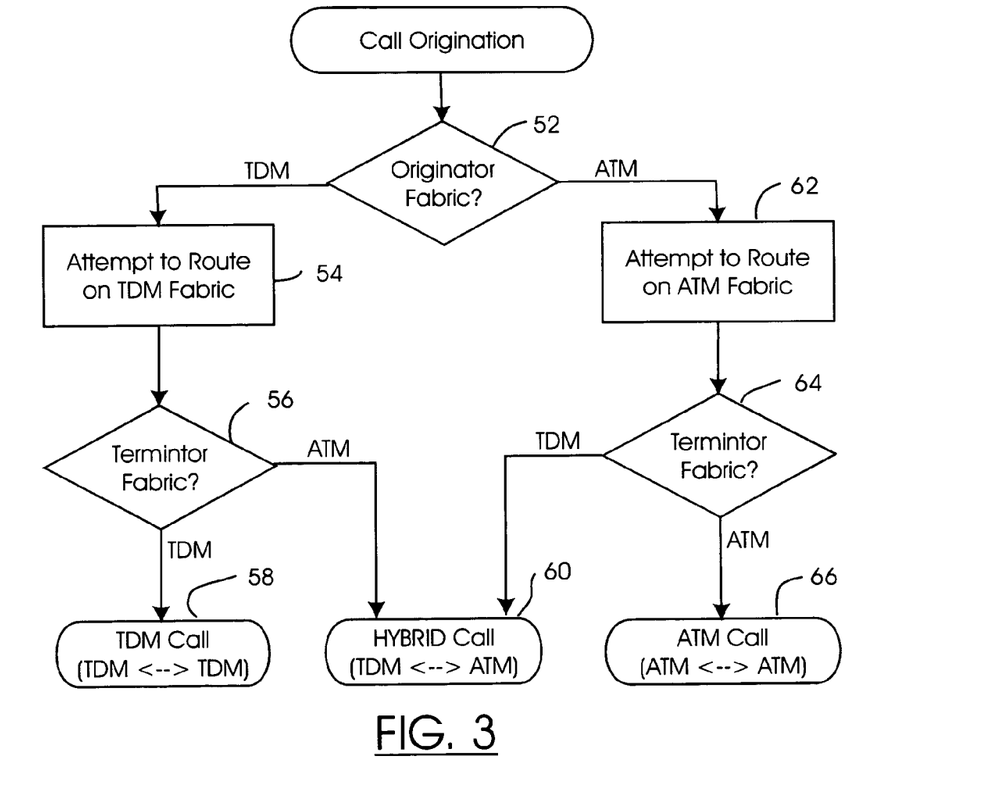
FIG. 3 is a flow chart showing the logic of the computing module call-type determination function used for inter-working translation and routing as well as connection broker connectivity control.

FIG. 3 is a simple flow chart illustrating the logic used by the call processing applications of the computing module 40 to make a call-type determination when a call request is received at the hybrid central office 24. Since existing inter-office trunks 28 (FIG. 1) may be used to complete calls in the subnetwork, the hybrid central office 24 must perform a call-type determination for each call request. In step 52, an originating point code, for example, of an initial address message (IAM) is examined to determine the originator fabric of a call. If the call is a TDM fabric call (originating in the PSTN or routed over inter-office trunks 28) an attempt is made to route the call on the TDM fabric in step 54. This is done in order to minimize the amount of inter-working between TDM and ATM sides. In order to route the call on the TDM fabric, the terminator fabric must be determined in step 56. If the terminator fabric is the TDM fabric, the call is determined to be a TDM fabric call in step 58. If the terminator fabric is ATM, the call is a hybrid call, as determined in step 60. A hybrid call is a TDM fabric-to-ATM or ATM-to-TDM fabric call. If the originator fabric determined in step 52 is ATM, an attempt is made is step 62 to route the call to the ATM fabric. In order to accomplish this, the terminator fabric is examined in step 64 and if the terminator fabric is TDM, the call is a hybrid call. Otherwise, the call is determined to be an ATM call in step 66.

Intra-Subnetwork Call Example

Figure 4:
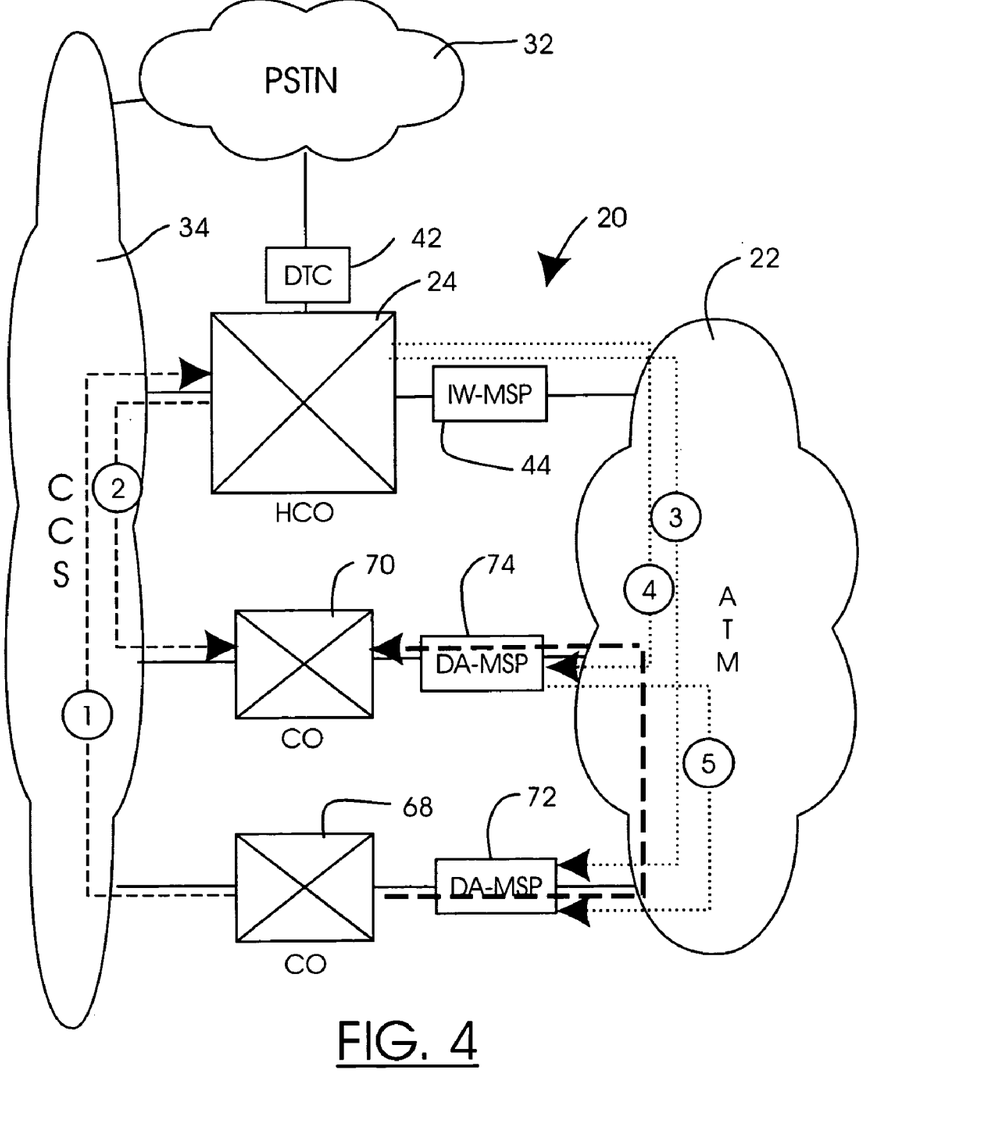
FIG. 4 is a schematic diagram showing the signaling sequence and signaling paths for an inter-office call completed between two end offices in a subnetwork in accordance with the invention.

FIG. 4 is a schematic diagram of a subnetwork 20 in accordance with the invention showing signaling paths for signal messages involved in the set up of an inter-office call between a first central office 68 and a second central office 70 which are respectively connected by a single large trunk group and DA-MSPs 72, 74 to the ATM backbone network 22.

A call is originated at the central office 68 when, for example, a subscriber goes off-hook and dials a called number. In response to the dialled digits, the central office 68 consults its translation and routing tables and determines that the call is an inter-office call. Inter-office calls may be routed over the TDM trunks 28 or the single large trunk group connected to the ATM network 22. In this example, the routing tables direct the central office 68 to route the inter-office call over the single large trunk group connected to the DA-MSP 72, for example, because all TDM trunks that could be used for the call are busy. Consequently, the central office formulates an SS7 initial address message (IAM) containing the called and the calling numbers, as well as other information well known to persons skilled in the art. The common channel signaling network routes the IAM to the point code of the hybrid central office 24 in a first step indicated by the numeral 1 shown on the dashed line representing the signaling path through the common channel signaling network 34. On receipt of the IAM, the hybrid central office 24 examines its translation tables and determines that the dialled digits are served by central office 70, also a part of the subnetwork 20. Consequently, the hybrid central office 24 modifies the IAM by:

1) replacing the originating point code (OPC) with its own point code;

2) replacing the destination point code (DPC) with the point code of the central office 70;

3) consulting a table respecting the occupation state of the single large trunk group connected to the DA-MSP 74 and selecting an available trunk member to serve the call. The available trunk member identification (TID) is inserted in the circuit identification code (CIC) field of the IAM.

It should be understood that the hybrid central office 24 maintains an occupation state table for each trunk member of each trunk group connected to a central office in the subnetwork 20. Occupation state tables are normally maintained and updated by central offices for all trunk groups which terminate on the office. Consequently, enabling the hybrid central office 24 to perform this function is a simple matter using facilities already available to the computing module 40 (FIG. 1). After sending the modified IAM through the CCS network 34 to the central office 70 in the step indicated by numeral 2, the computing module 40 uses information accumulated from translating the contents of the IAM to formulate messages to be transferred through the ATM backbone network 22 to enable an ATM-related fabric connection to serve the call. Consequently, in the step indicated by the numeral 3, the computing module 40 of the hybrid end office 24 formulates a fabric-control message (FCM) which is forwarded to the terminating DA-MSP 74. The fabric control message conveys the following information:

TDM path ends at the DA-MSP 74 and the DA-MSP 72;

endpoint addresses of the DA-MSP 74 and the DA-MSP 72;

other miscellaneous information including integrity values and the intent of the message (connect, disconnect, hold connection, etc.).

Optionally, the computing module 40 transfers the same information in a second FCM to the originating DA-MSP 72 in the step indicated by numeral 4. The signaling step 4 is not strictly required and may be omitted since the terminating DA-MSP 74 has all the information required to enable an ATM fabric connection. In either event, the terminating DA-MSP uses information in the FCM to formulate a message which can be transferred using an ATM operations and management (OAM) cell, or using ATM UNI signaling, to communicate with DA-MSP 72. The message is used to enable an SVC through the ATM backbone 22 or to synchronize an idle SVC removed from a cache, as explained in Applicant's co-pending patent application entitled METHOD AND APPARATUS FOR REDUCTION OF CALL SETUP RATE IN ATM NETWORK which was filed on Oct. 2, 1998, the entire specification of which is incorporated herein by reference. Although not illustrated in FIG. 4, it will be well understood in the art that the remaining steps in call set up and release involve the generation of Address Complete (ACM), Answer (ANM), Release (REL) and Release Complete (RLC) messages which are formulated at central office 70 and passed back through the common channel signaling network 34 to the central office 68, as will be explained below with reference to FIG. 6. It should also be understood that the order of the messages set out above is exemplary only. The FCMs may be sent prior to sending the modified IAM, as will be shown below in FIG. 6.

As is apparent from the diagram of FIG. 4, although the hybrid central office 24 performs the functions of a virtual tandem by enabling the completion of the inter-office call between the central offices 68 and 70, only the messaging and computing module functions of the hybrid central office 24 were used in the virtual tandem function. No trunking or fabric facilities were occupied during the process and no trunk or fabric facilities were tied up for the duration of the call. Consequently, the subnetwork 20 permits extremely efficient use of resources in completing inter-office calls which originate and terminate within the subnetwork 20.

Inter-Working Call Example

Figure 5:
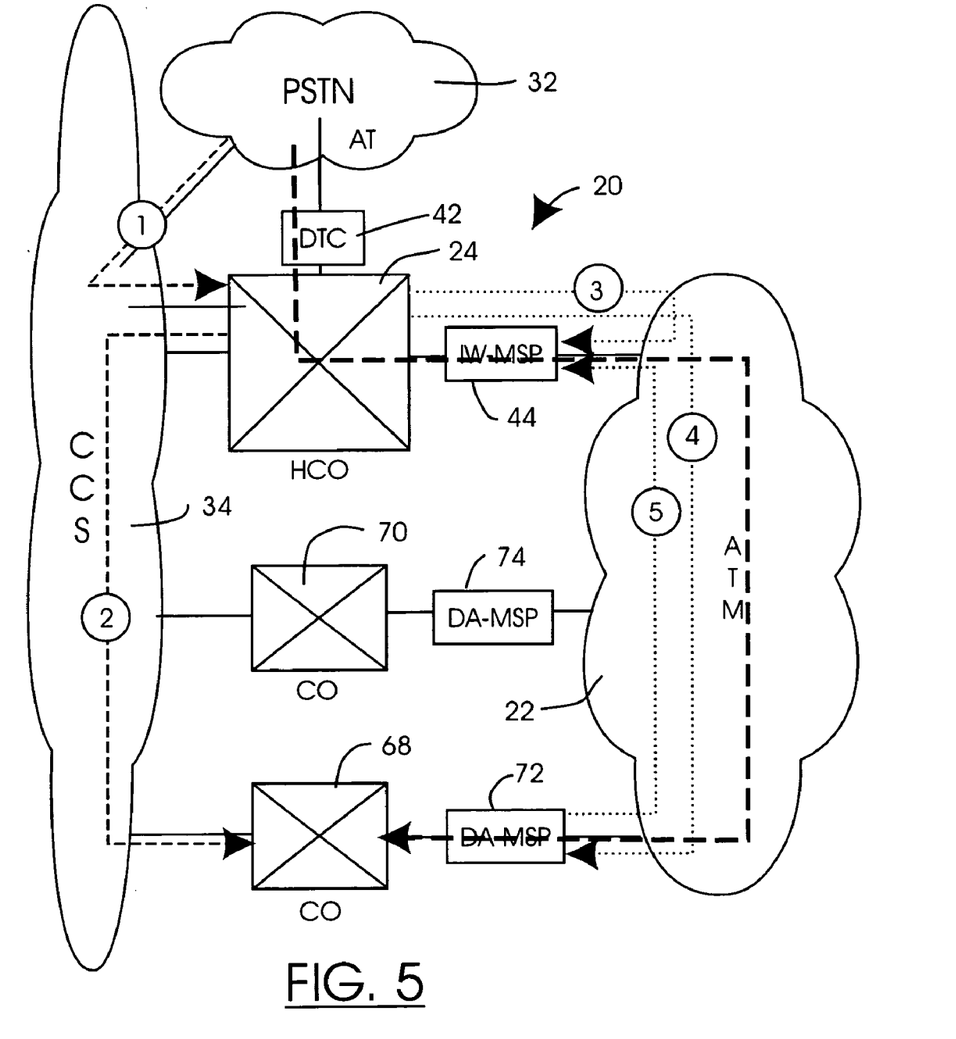
FIG. 5 is a schematic diagram showing a signaling sequence and signaling paths for a call which originates in the PSTN and terminates at a central office in a subnetwork in accordance with the invention.

FIG. 5 illustrates the signaling paths for an inter-office call which originates in the PSTN 32 and terminates at the central office 68, as shown in FIG. 5, an originating central office (not illustrated) in the PSTN 32 formulates an IAM which is forwarded in step 1 to the hybrid central office 24. On receipt of the IAM, the hybrid central office 24 consults its translation and routing tables and determines that the call is to be terminated on a line served by central office 68. Consequently, the central office 24 consults a trunk occupation table for the large trunk group connected to the DA-MSP 72 and selects an available trunk member. The hybrid central office 24 then modifies the IAM and forwards the modified IAM in step 2 to the central office 68. Concurrently, the computing module 40 (FIG. 1) formulates and transfers an FCM in step 3 to the terminating DA-MSP 72. Since this is an inter-working call (TDM-to-ATM), an inter-working bridge must be established. The computing module 40 selects an inter-working bridge. As explained above, the inter-working bridge is a resource which is maintained and allocated in the computing module 40 and is required for all inter-working calls. The identity of the inter-working bridge and call related information is relayed in step 4 to the IW-MSP 44 which initiates an application instance for the call. For the duration of the call, the application instance initiated by the IW-MSP 44 owns the inter-working bridge and the ATM/TDM path ends are mapped to the application instance where bearer path conversion is effected. Concurrently, terminating DA-MSP 72 formulates a message that is dispatched in step 5 to IW-MSP 44 to effect a connection to the ATM backbone 22. The heavy dashed line shows the path of the PCM data which traverses the respective networks between a calling party in the PSTN 32 and a called party served by the central office 68. As will be understood by those skilled in the art, this call could also be set up as two separate calls, one between the PSTN and the IW-MSP 44 and a second between the IW-MSP 44 and the DA-MSP 72. The signaling sequence for each is explained below in a section that explains an inter-working message sequence with reference to FIGS. 7 and 8.

Intra-Subnetwork Message Sequence

Figure 6:
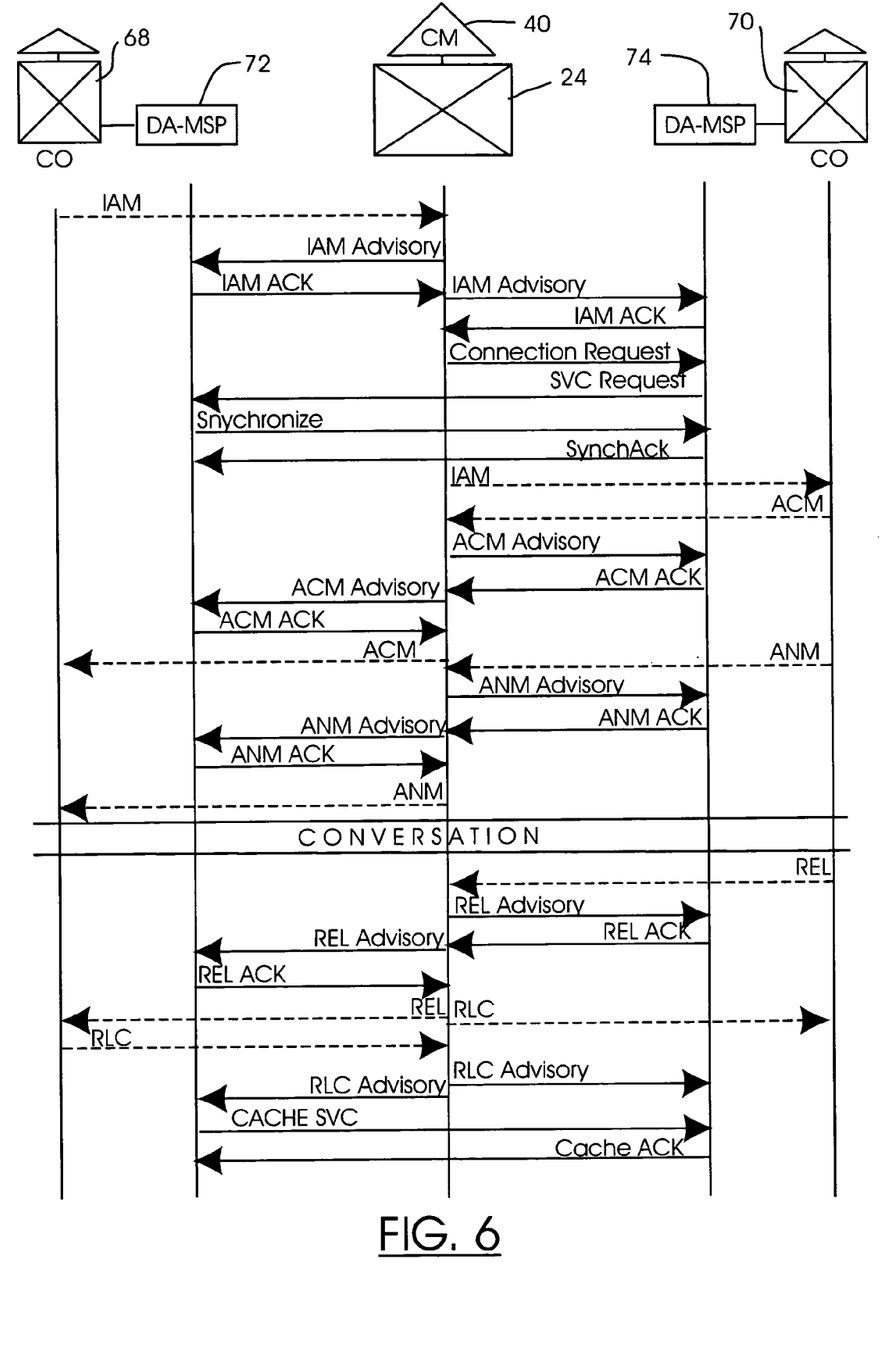
FIG. 6 is a call sequence diagram illustrating principal signaling message exchanges between network elements in the call sequence shown in FIG. 4.

FIG. 6 shows a call diagram characterizing the call message flow shown in FIG. 5 in more detail. As will be understood by those skilled in the art, FIG. 6 is a high level view of the messaging process that schematically represents only the most significant portions of the messages exchanged between the elements involved in call set up and control. As shown, the process begins when central office 68 responds to digits dialled through a subscriber line (not illustrated) by formulating and sending the IAM to the computing module 40 of the hybrid central office 24, as indicated by the dashed line. All SS7 messages shown in FIG. 6 are indicated by dashed lines, whereas messages sent over the ATM linksare shown in solid lines. On receipt of the IAM, the computing module 40 of the hybrid central office 24 formulates an IAM Advisory message which is forwarded to the DA-MSP 72 to advise it of the receipt of IAM. On receipt of the IAM Advisory message, the DA-MSP 72 returns an IAM acknowledgement (IAM ACK) message to the computing module 40. The computing module 40 also sends a IAM Advisory message to the DA-MSP 74 and an IAM ACK is returned.

Subsequently, the computing module 40 formulates a Connection Request message which it forwards to the terminating interface (DA-MSP 74). In response to the Connection Request message, the DA-MSP 74 formulates an SVC Request message. In the signaling sequence shown in FIG. 6, it is assumed that cached SVCs are used for enabling connections through the ATM backbone network 22. It is further assumed that the DA-MSP 72 is master of a cache of SVCs maintained between the respective DA-MSPs 72, 74. Consequently, the DA-MSP 74 must request an SVC from the master end. This procedure is explained in Applicant's co-pending patent application referenced above. On receipt of the SVC Request message, the DA-MSP examines its cache and extracts an idle SVC. A Synchronize message is returned over the idle SVC to test the SVC and synchronize the two interfaces. On receipt of the Synchronized message, the DA-MSP 74 returns an Acknowledgement message (SynchAck).

Concurrently, the computing module 40 modifies the IAM, as described above, and forwards it to the central office 70. On receipt of the IAM, the central office 70 verifies that the subscriber line is idle and available and returns an address complete (ACM) message. On receipt of the ACM message, the computing module 40 formulates an ACM Advisory message which it forwards through the ATM backbone network 22 to a DA-MSP 74 and the DA-MSP 72. ACM Acknowledgement messages are returned from each of the interfaces. On receipt of the respective acknowledgements, the computing module 40 forwards the ACM to the central office 68. Meanwhile, central office 70 applies ringing (not illustrated) to the subscriber line which is returned through the call path indicated by the heavy dashed line in FIG. 4, which passes through the ATM backbone network 22 to the central office 70 where the ringing is heard by the calling subscriber. When the called subscriber answers the telephone, the central office 70 formulates an ANM message which is sent to the computing module 40 of the hybrid central office 24. Computing module 40 responds by dispatching an ANM Advisory messages to each of the interfaces (DA-MSP 72, 74) and acknowledgements are returned from the respective interfaces. Computing module 40 there forwards the ANM message to the central office 68 and billing, if appropriate, commences for the call.

Conversation between the calling and called party ensues. In the example shown in FIG. 6, the called party terminates the call by going on-hook, which prompts the central office 70 to formulate and send a Release (REL) message to the hybrid central office 24. The REL message is received by the computing module 40 which responds by sending Release Advisory messages to the respective interfaces, (DA-MSP 72, 74). The respective interfaces respond with Release Acknowledgement (REL ACK) messages. On receipt of the REL ACKs, the computing module 40 forwards the REL message to the central office 68 which applies dial tone (not shown) to the calling party line and returns a Release Complete (RLC) message to the hybrid central office 24. On receipt of the RLC message, the computing module formulates RLC Advisory messages which are forwarded to the DA-MSPs 72, 74. No acknowledgement is expected to an RLC Advisory message. As explained above, a cached SVC was used to enable a connection through the ATM backbone network 22. The cache master at DA-MSP 72, on receipt of the RLC Advisory message, checks its cache size and determines that the idle SVC should be returned to cache. Consequently, the DA-MSP 72 formulates a message which is transferred through the ATM backbone network 22 to the DA-MSP 74 advising it to cache the SVC. The DA-MSP 74 preferably returns a Cache Acknowledgement message after releasing the cross-connect between the TDM end and the SVC and recording the idle status of the SVC in its cache table.

Inter-Working Message Sequence

Figure 7:
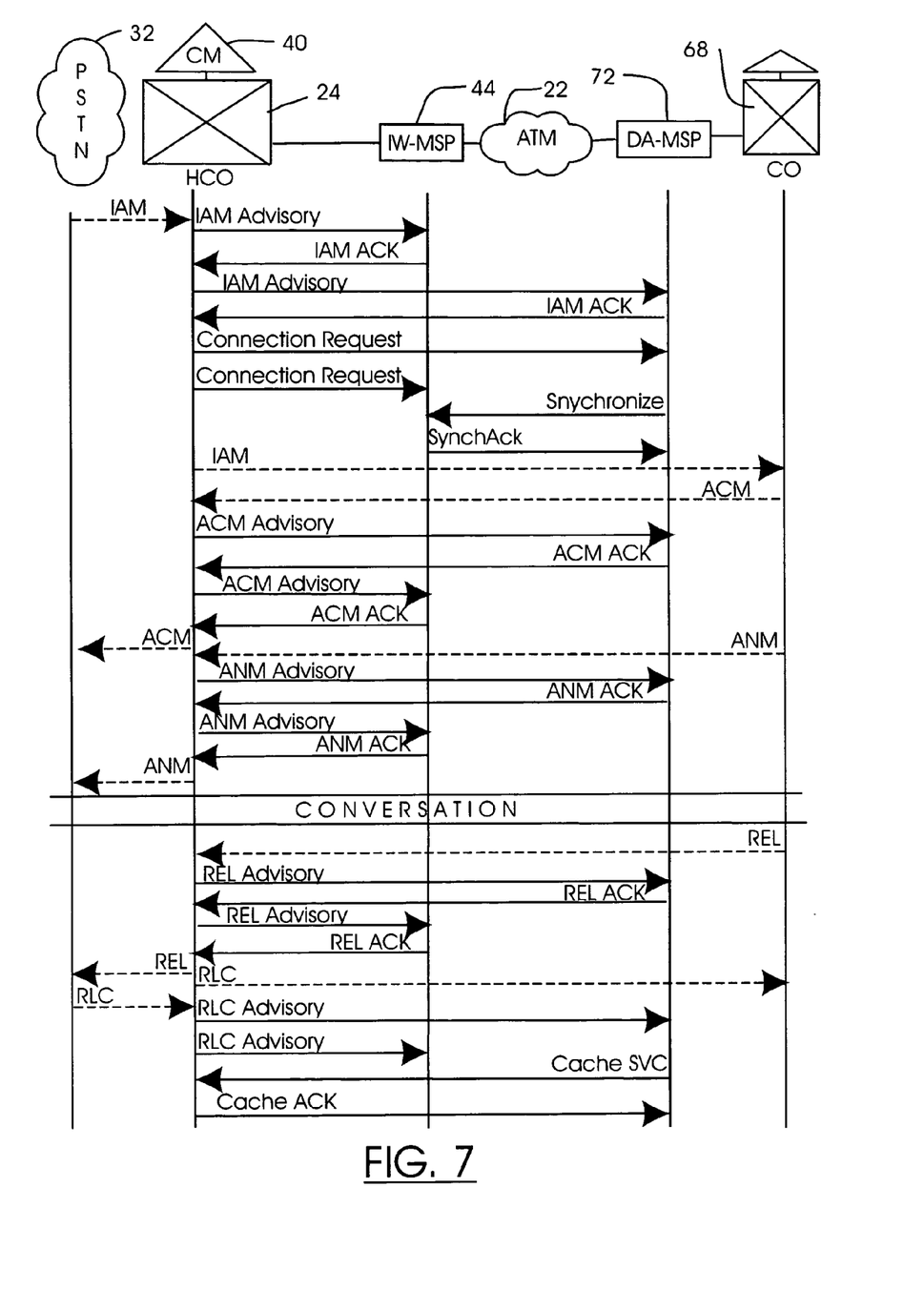
FIG. 7 is a call sequence diagram illustrating the principal signaling messages exchanged between network elements in a call sequence shown in FIG. 5.

FIG. 7 is a high level overview of the messages exchanged during call set up and release of the call schematically illustrated in FIG. 5. For the purposes of illustration, the sequence commences and ends at the PSTN 32 (FIG. 5) even though it will be understood by those skilled in the art that an unidentified switch in the PSTN 32 is actually the originator of the call and other intervening switches that are not illustrated may be involved in the call. As shown in FIG. 7, an IAM generated within the PSTN 32 (not illustrated) is received by the hybrid central office 24. The computing module 40 of the hybrid central office responds by sending an IAM Advisory message to the IW-MSP 44 and the DA-MSP 72. Each return a IAM ACK message. On receipt of the respective IAM ACK messages, the computing module 40 formulates and transfers a connection request to the terminating DA-MSP 72 providing the connection information described above with reference to FIG. 6. Thereafter, the computing module 40 selects an idle inter-working bridge and formulates an inter-working connection request message which it sends to the IW-MSP 44. IW-MSP 44 responds by generating an inter-working application instance as described above with reference to FIG. 5.

Concurrently, the DA-MSP 72 selects an idle SVC from its SVC cache and sends a synchronized message over the SVC to the IW-MSP. The synchronized message identifies the call to the IW-MSP and it responds with a Synch Ack message indicating that it has identified the SVC and mapped it to the TDM end of the call. Consequently, the computing module 40 of the hybrid central office 24 forwards the IAM to the central office 68. On receipt of the IAM, the central office 68 translates the called number and verifies that the subscriber line is in-service and available. On verification, the central office 68 returns an ACM message to the hybrid central office 24. In response, the computing module 40 of the hybrid central office 24 formulates and dispatches ACM Advisory messages to both the DA-MSP 72 and the IW-MSP 44. Each interface responds with a ACM ACK message. On receipt of the responses, the computing module 40 forwards the ACM message to the access tandem 30. After sending the ACM message, the central office 68 applies ringing to the subscriber line (not illustrated) which travels back through the connection established through DA-MSP 72, ATM backbone network 22, IW-MSP 44, hybrid central office 24 and access tandem 30 to be heard by the calling party, as is well understood in the art. When the called party answers the ringing signal, the central office 68 formulates an ANM message which it returns to the hybrid central office 24. The hybrid central office 24 sends ANM Advisory messages to each of the interfaces which return ANM ACK messages.

On receipt of the ANM ACK messages, the hybrid central office 24 forwards the ANM message to the access tandem 30 which forwards the messages to the originating switch (not illustrated) in the PSTN and billing for the call commences.

Thereafter, conversation between the parties ensues. The release sequence for the call is substantially identical to the release sequence described above with reference to FIG. 6. As is explained above, the called party terminates the conversation by going on-hook which prompts the central office 68 to formulate and send a release message through the common channel signaling message 34 (FIG. 1) to the hybrid central office 24. The hybrid central office 24 responds by sending REL Advisory messages to each of the interfaces which return REL ACK response messages. The hybrid central office 24 then forwards the REL message to the access tandem 30 which forwards it through the PSTN as described above. The hybrid central office 40 then returns a RLC message to the central office 68 which releases all resources. A RLC message is also returned from access tandem 30 which prompts the computing module 40 to formulate and send RLC Advisory messages to each of the interfaces. No response to the RLC Advisory Messages is expected. On receipt of the RLC Advisory message, the DA-MSP 72, who is master of the SVC cache checks cache size and determines that SVC used for the released call should be cached for future use in call set up. The DA-MSP 72 therefore adds the SVC to cache and sends a Cache SVC message to the IW-MSP 44 which responds with a Cache ACK message indicating that the terminating end of the SVC has been cached for reuse.

Figure 8:
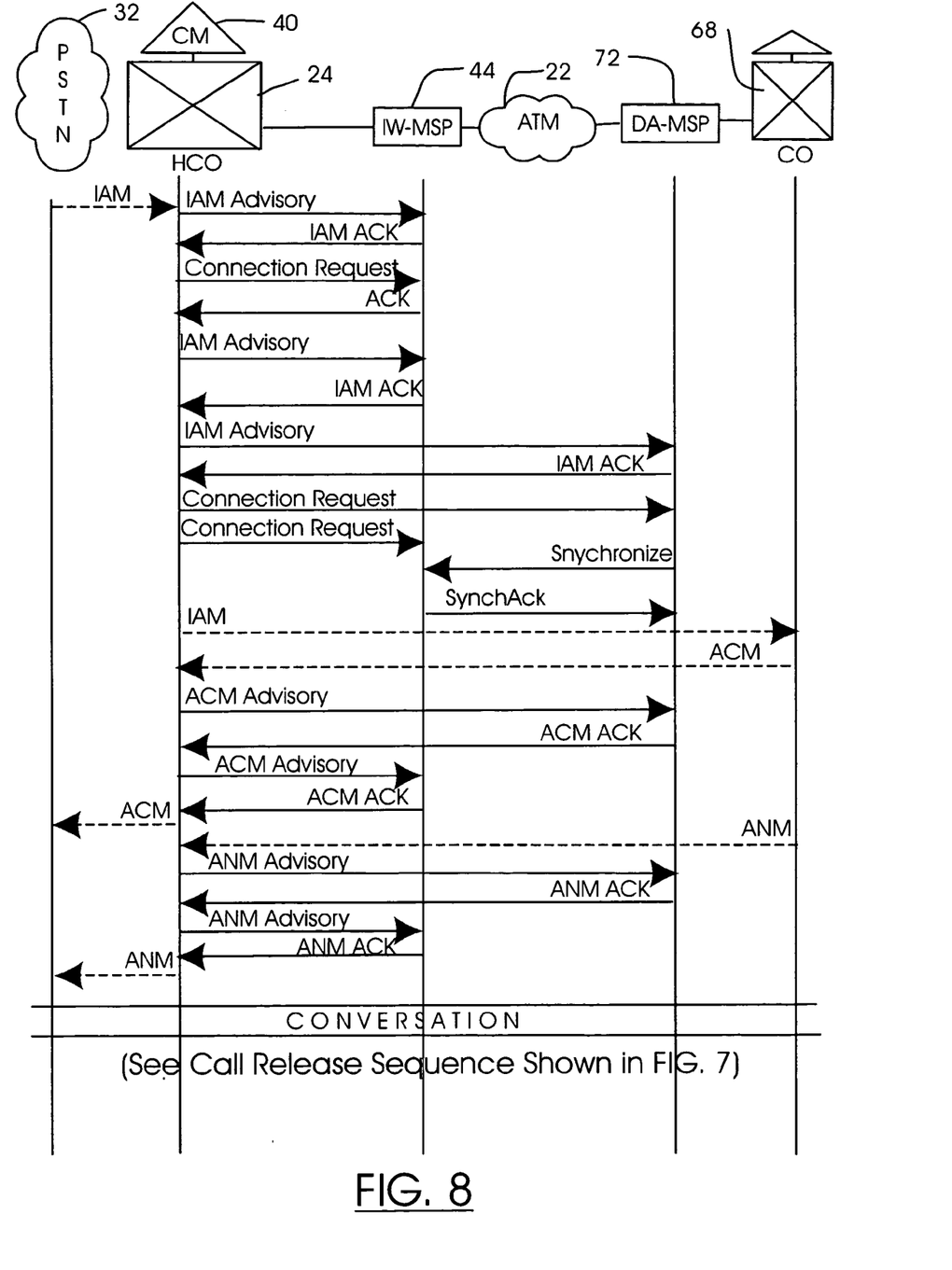
FIG. 8 is a call sequence diagram illustrating the principal signaling messages exchanged between network elements in an alternate method for implementing the call sequence shown in FIG. 5.

FIG. 8 is a high-level overview of the messages exchanged during call setup and release of the call schematically illustrated in FIG. 5, wherein the call setup progresses as two separate calls, a first TDM call being setup between the IW-MSP 44 and the PSTN 32 and a second ATM call which is setup between the DA-MSP 72 and the IW-MSP 44. The two calls are bridged between the DTC 42 and the IS-MSP 44 as described above.

As shown in FIG. 8, an IAM generated within the PSTN 32 is received by the hybrid central office 24. The computing module of the hybrid central office 24 responds by sending an IAM advisory message to the IW-MSP 44. The IW-MSP 44 responds with an IAM ACK message. On receipt of the acknowledgement, the computing module 40 forwards a connection request to the IW-MSP 44 providing the connection information for establishing an inter-working bridge between the DTC 42 and the IW-MSP 44 using an inter-working bridge resource as explained above. On receipt of the connection request, the IW-MSP establishes the inter-working bridge and returns an acknowledgement message (ACK). Thereafter, the computing module 40 formulates and forwards a second IAM advisory to the IW-MSP 44. The second IAM advisory sent to the IW-MSP 44 contains information related to the ATM leg of the call. Thereafter, the messaging sequence follows the steps described above with relation to FIG. 7 with the exception that the ISUP ACM and ANM messages are not returned to the PSTN 32 until corresponding ACM ACK and ANM ACK messages are received by the ATM leg of the call. On receipt of the ACM ACK message, the computing module 40 forwards an ACM back to the originating switch in the PSTN 32. On receipt of the ANM ACK, the computing module 40 forwards an ANM back to the originating switch in the PSTN 32. Both actions are shown on the lower left of FIG. 8. The call release sequence may also follow the steps described above with reference to FIG. 7.

Although in the call examples described above, call processing was controlled by the computing module 40 of the hybrid central office 24, it should be understood that the interfaces 44, 72 and 74 may be connected to the common channel signaling network 34 and may control all call setup and call processing. In that case, the IW-MSP 44 is responsible for call processing rather than the computing module 40.

Changes and modifications to the above-identified embodiments will no doubt become apparent to those skilled in the art. The scope of this invention is therefore intended to be limited solely by the scope of the appended claims.

What is claimed is:

1. A telephony switch comprising:
    a switching fabric;
    a first interface adapted to connect the switching fabric to a packet fabric;
    a computing module operatively associated with the switching fabric and the first interface and capable of establishing calls through the switching fabric, the packet fabric, and the switching fabric and the packet fabric, the computing module adapted to:
        receive a call request for establishing a call between an originating endpoint and a terminating endpoint;
        based on the originating endpoint and the terminating endpoint, determine a select one of the switching fabric, the packet fabric, and the switching fabric and the packet fabric through which to establish the call; and
        establish the call through the select one of the switching fabric, the packet fabric, and the switching fabric and the packet fabric, wherein when at least one of the originating and terminating endpoints is coupled to the packet fabric, the call is established in part by sending a message to one of the at least one of the originating and the terminating endpoints to instruct the one of the at least one of the originating and terminating endpoints to enable communication for the call through the packet fabric.

2. The switch of claim 1 further comprising a second interface adapted to connect the switching fabric to a public switched telephone network (PSTN).

3. The switch of claim 2 wherein when the originating endpoint and the terminating endpoint are coupled to the PSTN, the computing module is adapted to establish the call through the switching fabric.

4. The switch of claim 3 wherein when the originating endpoint and the terminating endpoint are both coupled to the packet fabric, the computing module is adapted to establish the call through the packet fabric.

5. The switch of claim 4 wherein when the originating endpoint is coupled to the PSTN and the terminating endpoint is coupled to the packet fabric, the computing module is adapted to establish the call through the switching fabric and the packet fabric via the first interface.

6. The switch of claim 5 wherein when the originating endpoint is coupled to the packet fabric and the terminating endpoint is coupled to the PSTN, the computing module is adapted to establish the call through the packet fabric and the switching fabric via the first interface.

7. The switch of claim 2 wherein the computing module is further adapted to establish an inter-working bridge across the switching fabric for the call when the originating endpoint is coupled to the packet fabric and the terminating endpoint is coupled to the PSTN and when the originating endpoint is coupled to the PSTN and the terminating endpoint is coupled to the packet fabric.

8. The switch of claim 7 wherein the first interface is further adapted to support the inter-working bridge across the switching fabric.

9. The switch of claim 8 wherein the first interface is further adapted to generate an application instance for the inter-working bridge.

10. The switch of claim 2 wherein the computing module operates to minimize the number of calls established through the switching fabric and the packet fabric.

11. The switch of claim 2 wherein the computing module is further adapted to formulate and send fabric control messages used to establish virtual connections in the packet fabric for transferring bearer traffic associated with the call when the originating endpoint, terminating endpoint, or the originating and terminating endpoints are coupled to the packet fabric.

12. The switch of claim 1 wherein the computing module is adapted to receive the call request via a signaling network.

13. The switch of claim 12 wherein the signaling network is a common channel signaling network.

14. The switch of claim 1 wherein the computing module comprises a signaling interface coupled to the packet fabric, the signaling interface adapted to receive call signaling messages from and send call signaling messages to the originating endpoint, the terminating endpoint, or the originating endpoint and the terminating endpoint through the packet fabric.

15. The switch of claim 1 wherein the packet fabric is a backbone network.

16. The switch of claim 1 wherein when both the originating and terminating endpoints are coupled to the packet fabric, the computing module is further adapted to send a message to one of the originating and the terminating endpoints, thereby instructing the one of the originating and terminating endpoints to communicate with the other of the originating and terminating endpoints to enable communication for the call through the packet fabric.

17. The switch of claim 1 wherein when the originating endpoint is coupled to the PSTN and the terminating endpoint is coupled to the packet fabric, the computing module is further adapted to send a message to the terminating endpoint, thereby instructing the terminating endpoint to communicate with the first interface to enable communication for the call through the packet fabric.

18. The switch of claim 1 wherein when the originating endpoint is coupled to the packet fabric and the terminating endpoint is coupled to the PSTN, the computing module is further adapted to send a message to the originating endpoint, thereby instructing the originating endpoint to communicate with the first interface to enable communication for the call through the packet fabric.

19. A telephony switch comprising:
    means for interfacing a switching fabric in the telephony switch to a packet fabric;
    means for establishing calls through the switching fabric, the packet fabric, and the switching fabric and the packet fabric comprising:
        means for receiving a call request for establishing a call between an originating endpoint and a terminating endpoint;
        means for determining a select one of the switching fabric, the packet fabric, and the switching fabric and the packet fabric through which to establish the call based on the originating endpoint and the terminating endpoint; and
        the means for establishing for adapted to establish the call through the select one of the switching fabric, the packet fabric, and the switching fabric and the packet fabric, wherein when at least one of the originating and terminating endpoints is coupled to the packet fabric, the call is established in part by sending a message to one of the at least one of the originating and the terminating endpoints, thereby instructing the one of the at least one of the originating and terminating endpoints to enable communication for the call through the packet fabric.

20. The switch of claim 19 further comprising a means for interfacing the switching fabric to a public switched telephone network (PSTN).

21. The switch of claim 20 wherein when the originating endpoint and the terminating endpoint are coupled to the PSTN, the means for establishing the call establishes the call through the switching fabric.

22. The switch of claim 21 wherein when the originating endpoint and the terminating endpoint are both coupled to the packet fabric, the means for establishing the call establishes the call through the packet fabric.

23. The switch of claim 22 wherein when the originating endpoint is coupled to the PSTN and the terminating endpoint is coupled to the packet fabric, the means for establishing the call establishes the call through the switching fabric and the packet fabric via the first interface.

24. The switch of claim 23 wherein when the originating endpoint is coupled to the packet fabric and the terminating endpoint is coupled to the PSTN, the means for establishing the call establishes the call through the packet fabric and the switching fabric via the first interface.

25. The switch of claim 20 wherein means for establishing the call is further adapted to establish an inter-working bridge across the switching fabric for the call when the originating endpoint is coupled to the packet fabric and the terminating endpoint is coupled to the PSTN and when the originating endpoint is coupled to the PSTN and the terminating endpoint is coupled to the packet fabric.

26. The switch of claim 25 wherein the means for interfacing the switching fabric to the packet fabric is further adapted to support the inter-working bridge across the switching fabric.

27. The switch of claim 26 wherein the means for interfacing the switching fabric to the packet fabric is further adapted to generate an application instance for the inter-working bridge.

28. The switch of claim 20 wherein the means for establishing the call operates to minimize the number of calls established through the switching fabric and the packet fabric.

29. The switch of claim 20 wherein the means for establishing the call is further adapted to formulate and send fabric control messages used to establish virtual connections in the packet fabric for transferring bearer traffic associated with the call when the originating endpoint, terminating endpoint, or the originating and terminating endpoints are coupled to the packet fabric.

30. The switch of claim 19 wherein the means for receiving the call request receives the call request via a signaling network.

31. The switch of claim 30 wherein the signaling network is a common channel signaling network.

32. The switch of claim 19 wherein the means for establishing the call further comprises a means for communicating with the packet fabric, wherein the means for communicating with the packet fabric is adapted to receive call setup messages from and send call setup messages to the originating endpoint, the terminating endpoint, or the originating endpoint and the terminating endpoint through the packet fabric.

33. The telephony switch of claim 19 wherein the packet fabric is a backbone network.

34. The telephony switch of claim 19 wherein when both the originating and terminating endpoints are coupled to the packet fabric, the means for establishing calls is further adapted to send a message to one of the originating and the terminating endpoints, thereby instructing the one of the originating and terminating endpoints to communicate with the other of the originating and terminating endpoints to enable communication for the call through the packet fabric.

35. The telephony switch of claim 19 wherein when the originating endpoint is coupled to the PSTN and the terminating endpoint is coupled to the packet fabric, the means for establishing calls is further adapted to send a message to the terminating endpoint, thereby instructing the terminating endpoint to communicate with the first interface to enable communication for the call through the packet fabric.

36. The method of claim 19 wherein when the originating endpoint is coupled to the packet fabric and the terminating endpoint is coupled to the PSTN, the means establishing calls is further adapted to send a message to the originating endpoint, thereby instructing the originating endpoint to communicate with the first interface to enable communication for the call through the packet fabric.

37. A method of establishing a call between an originating endpoint and a terminating endpoint through a hybrid switch capable of establishing calls through a switching fabric, a packet fabric, and a switching fabric and a packet fabric, the method comprising:
 interfacing a switching fabric in the telephony switch to a packet fabric and a public switched telephone network (PSTN) using a first interface;
 receiving a call request for establishing a call between an originating endpoint and a terminating endpoint;
 determining a select one of the switching fabric, the packet fabric, and the switching fabric and the packet fabric through which to establish the call based on the originating endpoint and the terminating endpoint; and
 establishing the call through the select one of the switching fabric, the packet fabric, and the switching fabric and the packet fabric;
 wherein when at least one of the originating and terminating endpoints is coupled to the packet fabric, establishing the call comprises sending a message to one of the at least one of the originating and the terminating endpoints, thereby instructing the one of the at least one of the originating and terminating endpoints to enable communication for the call through the packet fabric.

38. The method of claim 37 wherein when the originating endpoint is coupled to the PSTN and the terminating endpoint is coupled to the PSTN, the establishing step comprises establishing the call through the switching fabric.

39. The method of claim 38 wherein when the originating endpoint is coupled to the PSTN and the terminating endpoint is coupled to the packet fabric, the establishing step comprises establishing the call through the switching fabric and the packet fabric.

40. The method of claim 39 wherein when the originating endpoint is coupled to the packet fabric and the terminating endpoint is coupled to the PSTN fabric, the establishing step comprises establishing the call through the switching fabric and the packet fabric.

41. The method of claim 40 wherein when the originating endpoint is coupled to the packet fabric and the terminating endpoint is coupled to the packet fabric, the establishing step comprises establishing the call through the packet fabric.

42. The method of claim 37 wherein the receiving the call request step comprises receiving the call request via a signaling network.

43. The method of claim 37 wherein the establishing the call step comprises establishing an inter-working bridge across the switching fabric for the call when the originating endpoint is coupled to the packet fabric and the terminating endpoint is coupled to the PSTN and when the originating endpoint is coupled to the PSTN and the terminating endpoint is coupled to the packet fabric.

44. The method of claim 37 wherein the establishing the call step comprises receiving call setup messages from and sending call setup messages to the originating endpoint, the terminating endpoint, or the originating endpoint and the terminating endpoint through the packet fabric.

45. The method of claim 37 wherein the establishing the call step minimizes the number of calls established through the switching fabric and the packet fabric.

46. The method of claim 37 wherein the establishing the call step comprises formulating and sending fabric control messages used to establish virtual connections in the packet fabric for transferring bearer traffic associated with the call when the originating endpoint, terminating endpoint, or the originating and terminating endpoints are coupled to the packet fabric.

47. The method of claim 37 wherein the packet fabric is a backbone network.

48. The method of claim 37 wherein when both the originating and terminating endpoints are coupled to the packet fabric, establishing the call further comprises sending a message to one of the originating and the terminating endpoints, thereby instructing the one of the originating and terminating endpoints to communicate with the other of the originating and terminating endpoints to enable communication for the call through the packet fabric.

49. The method of claim 37 wherein when the originating endpoint is coupled to the PSTN and the terminating endpoint is coupled to the packet fabric, establishing the call further comprises sending a message to the terminating endpoint, thereby instructing the terminating endpoint to communicate with the first interface to enable communication for the call through the packet fabric.

50. The method of claim 37 wherein when the originating endpoint is coupled to the packet fabric and the terminating endpoint is coupled to the PSTN, establishing the call further comprises send a message to the originating endpoint, thereby instructing the originating endpoint to communicate with the first interface to enable communication for the call through the packet fabric.

* * * * *